Figure 7:
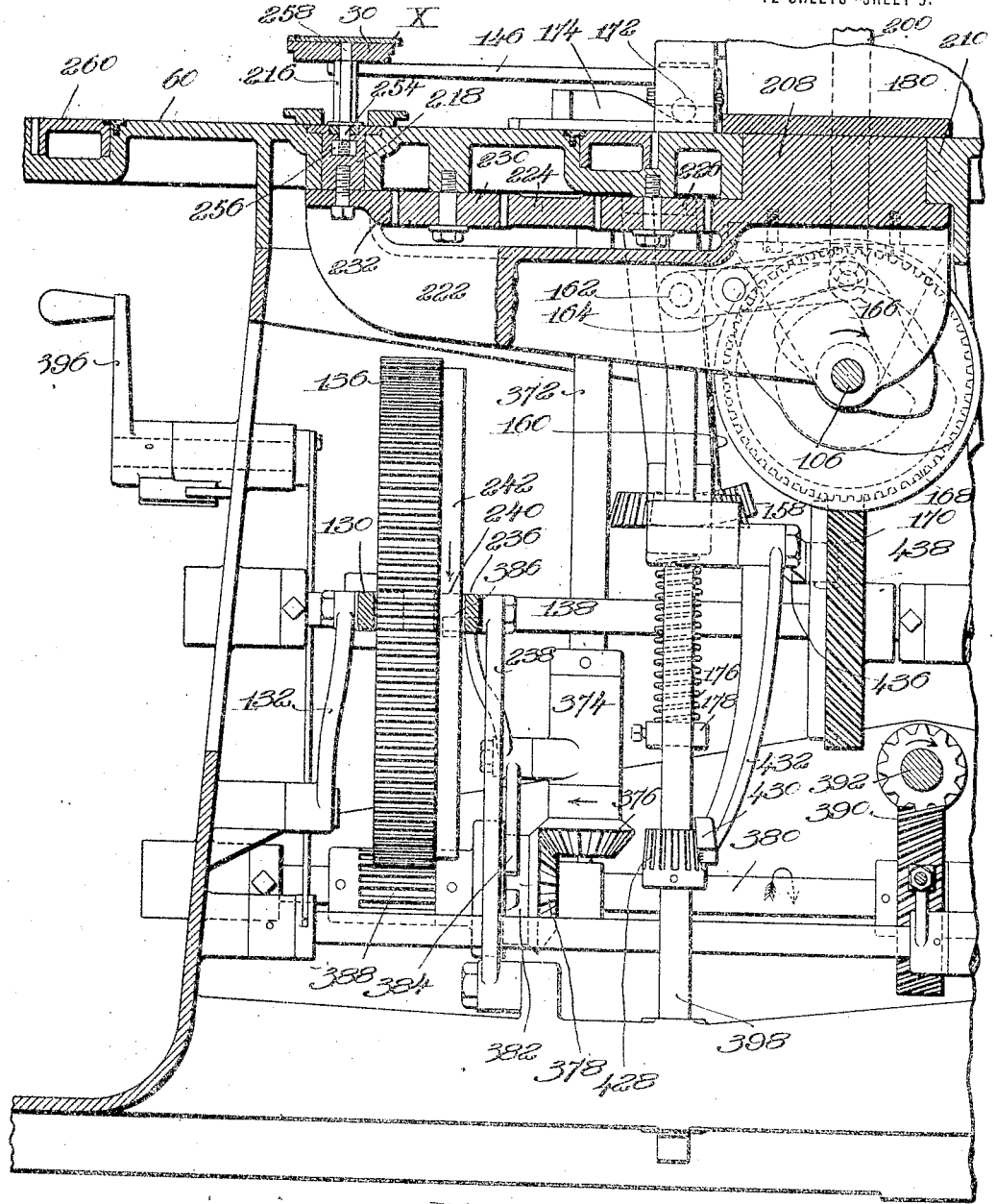

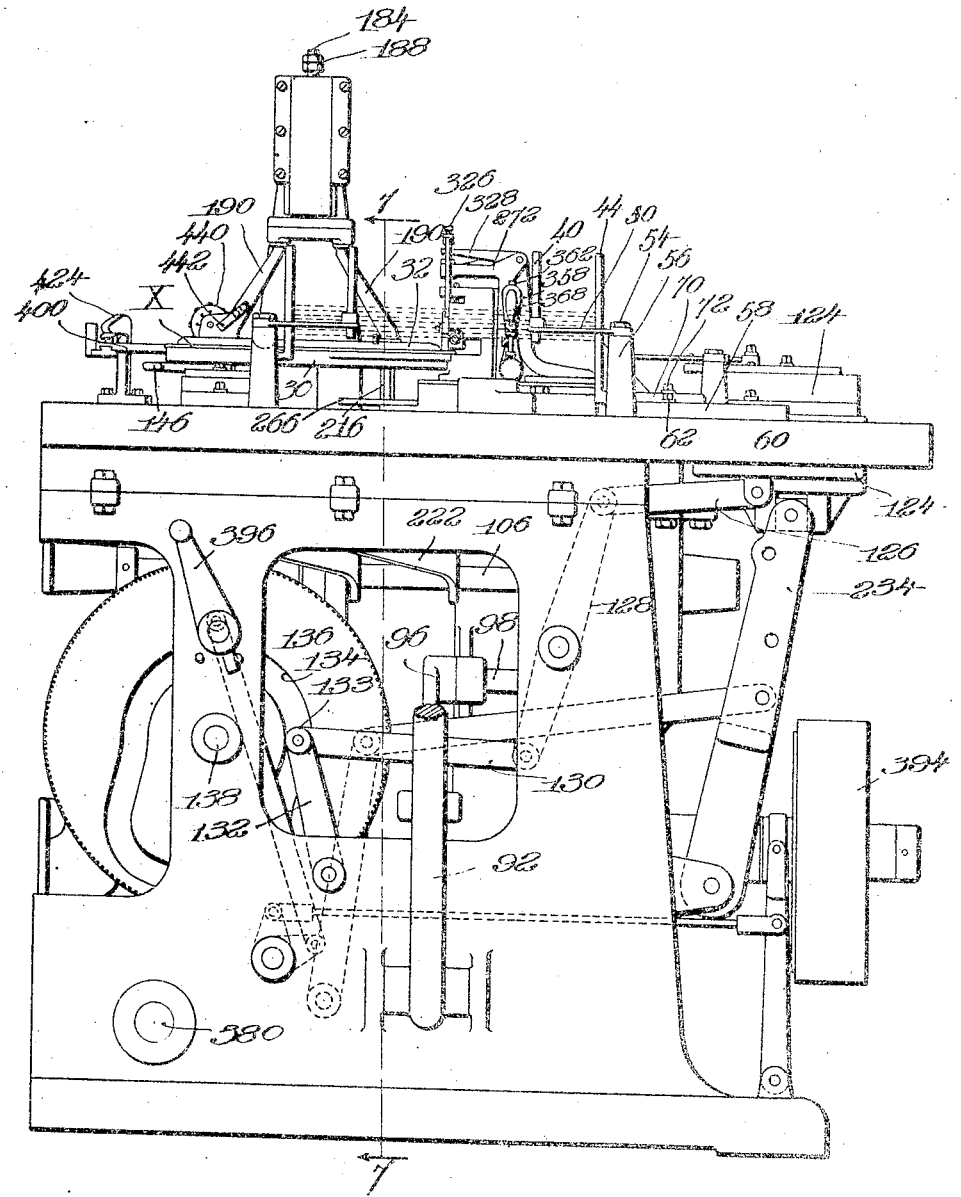

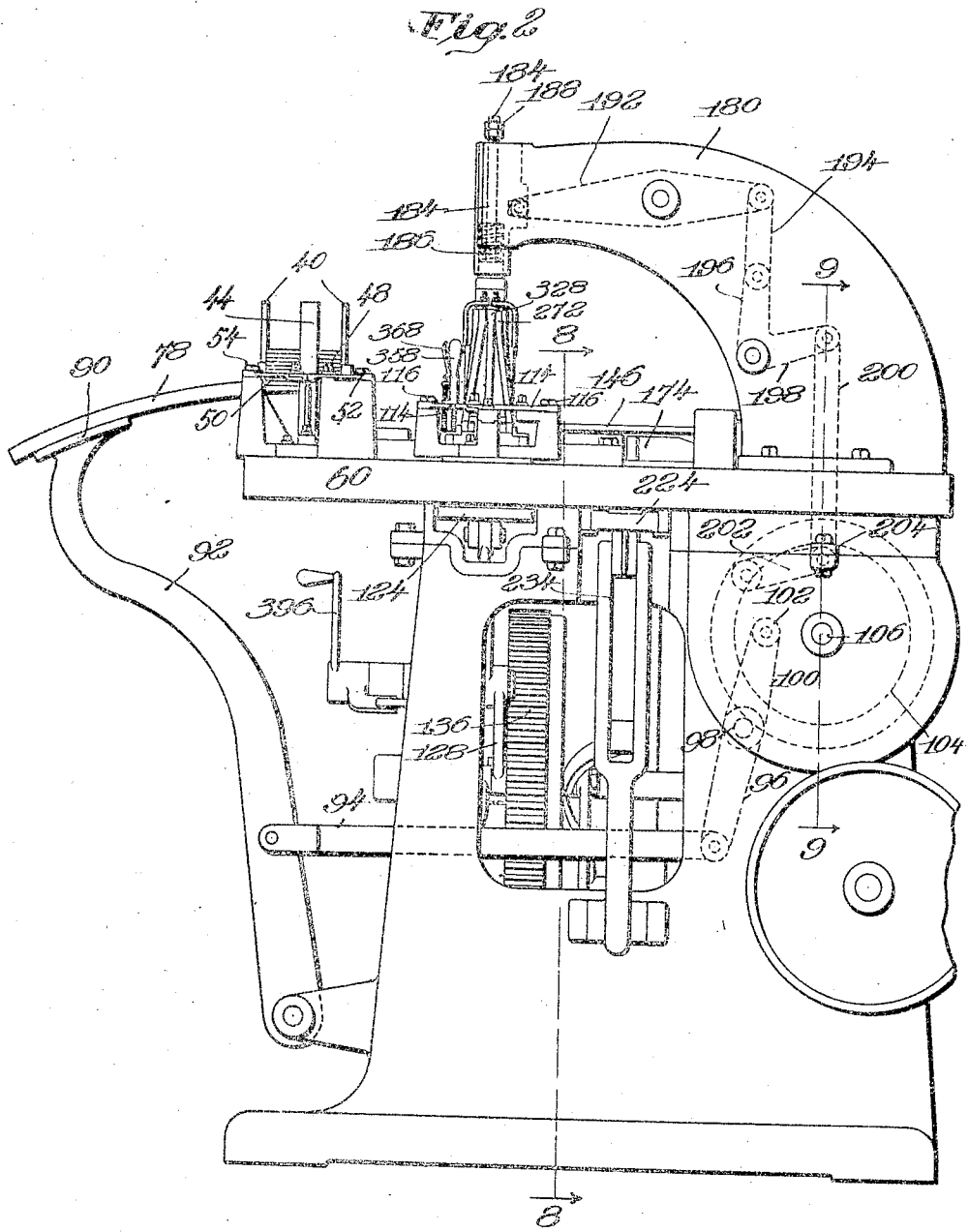

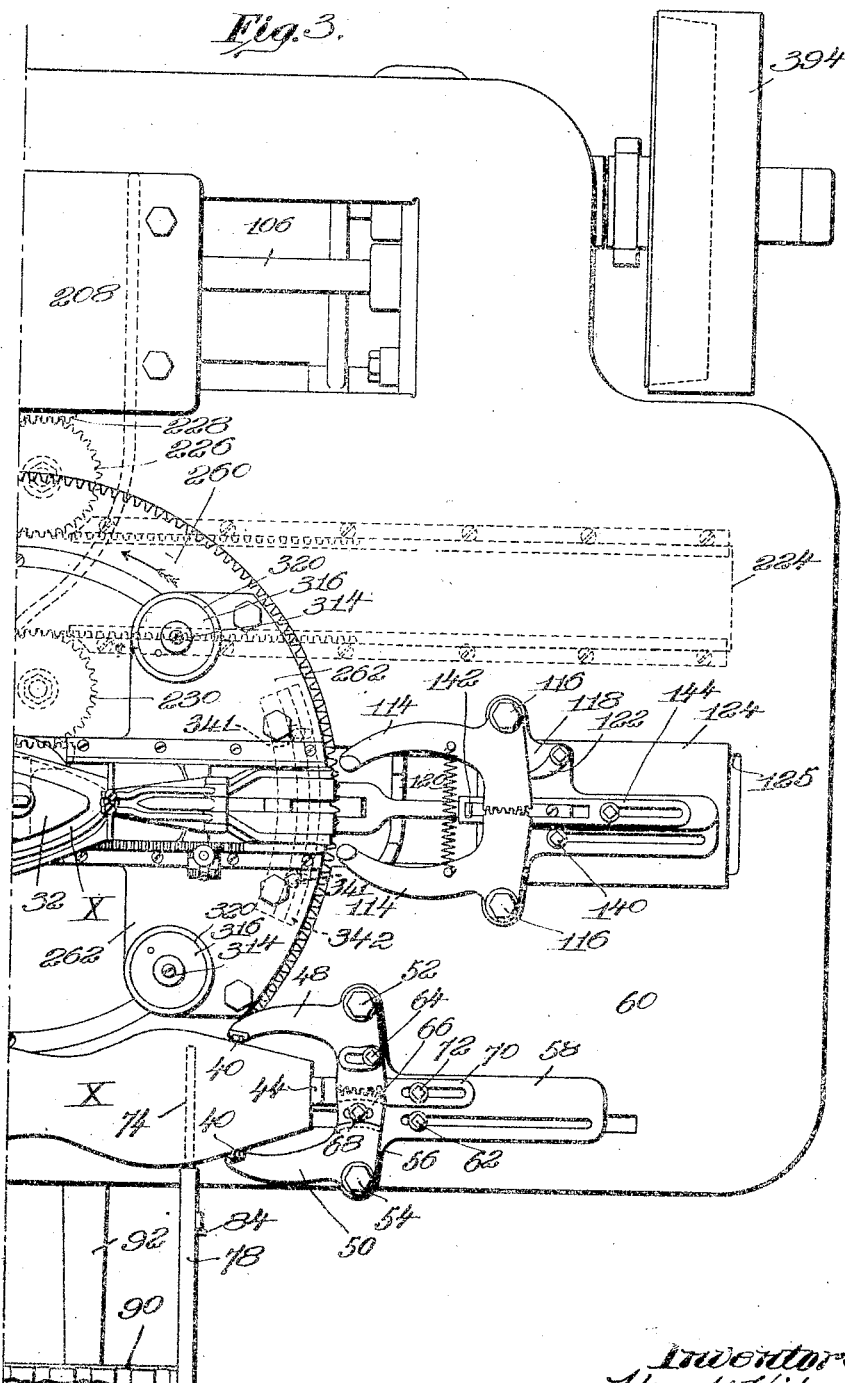

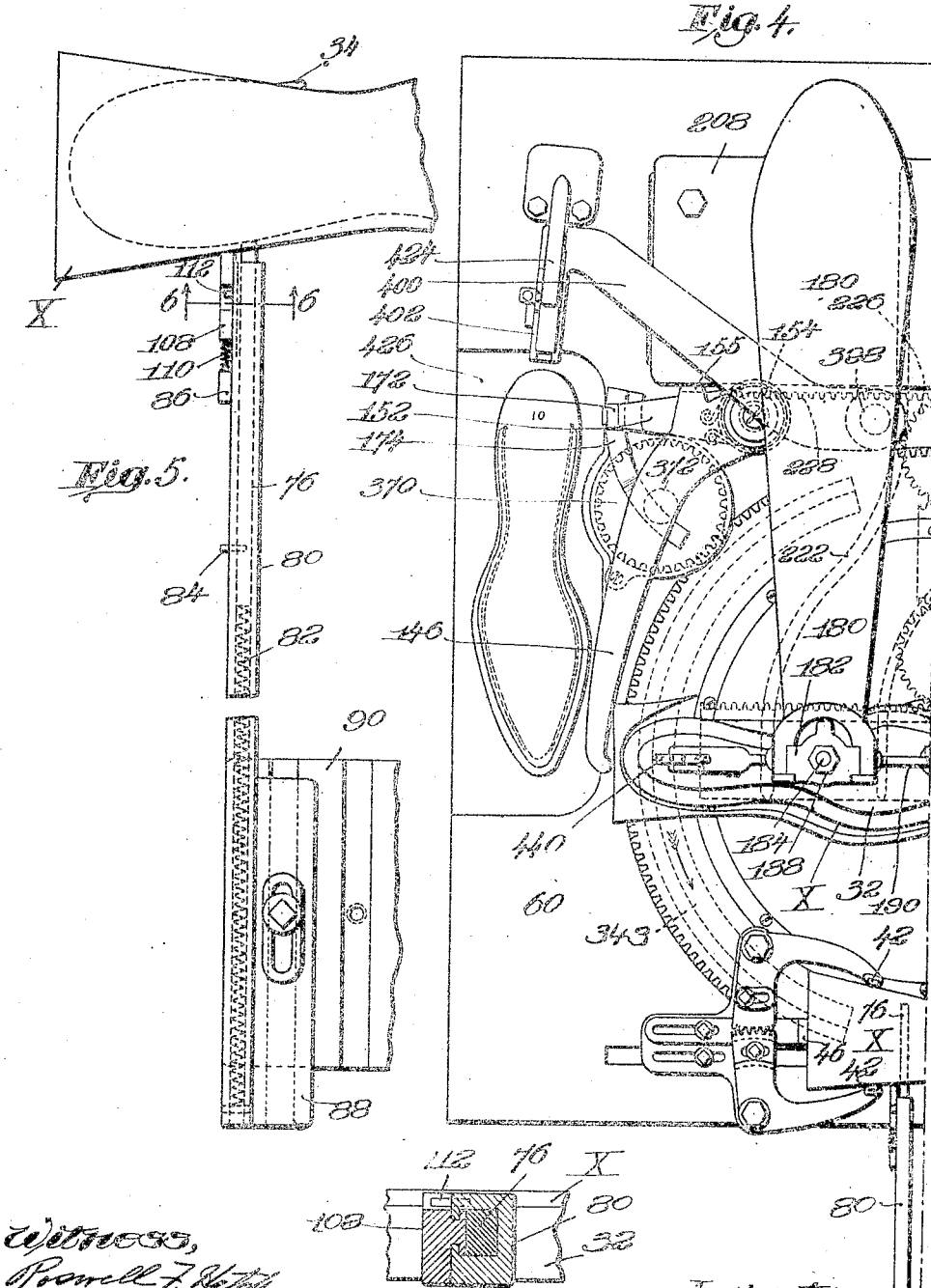

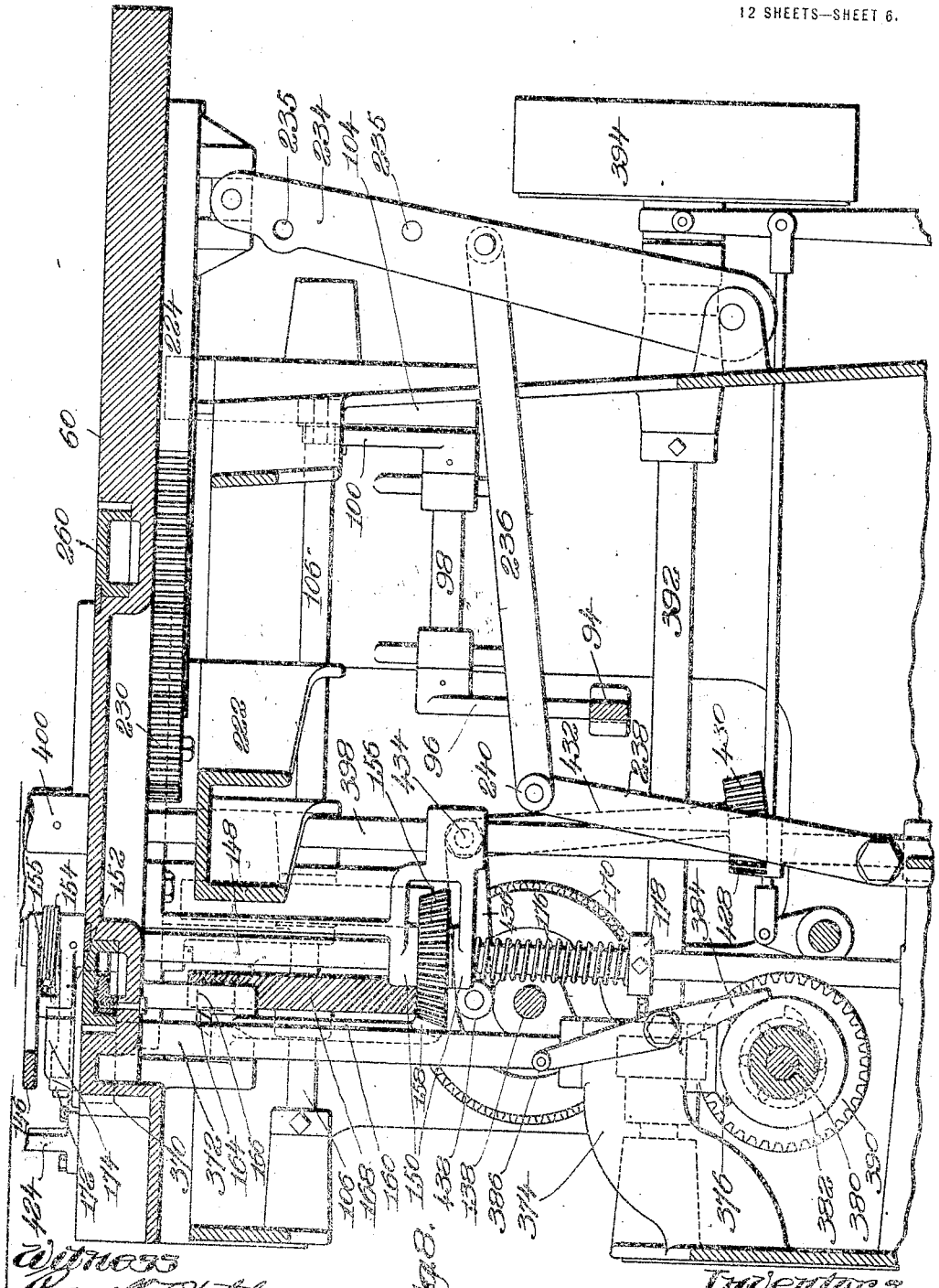

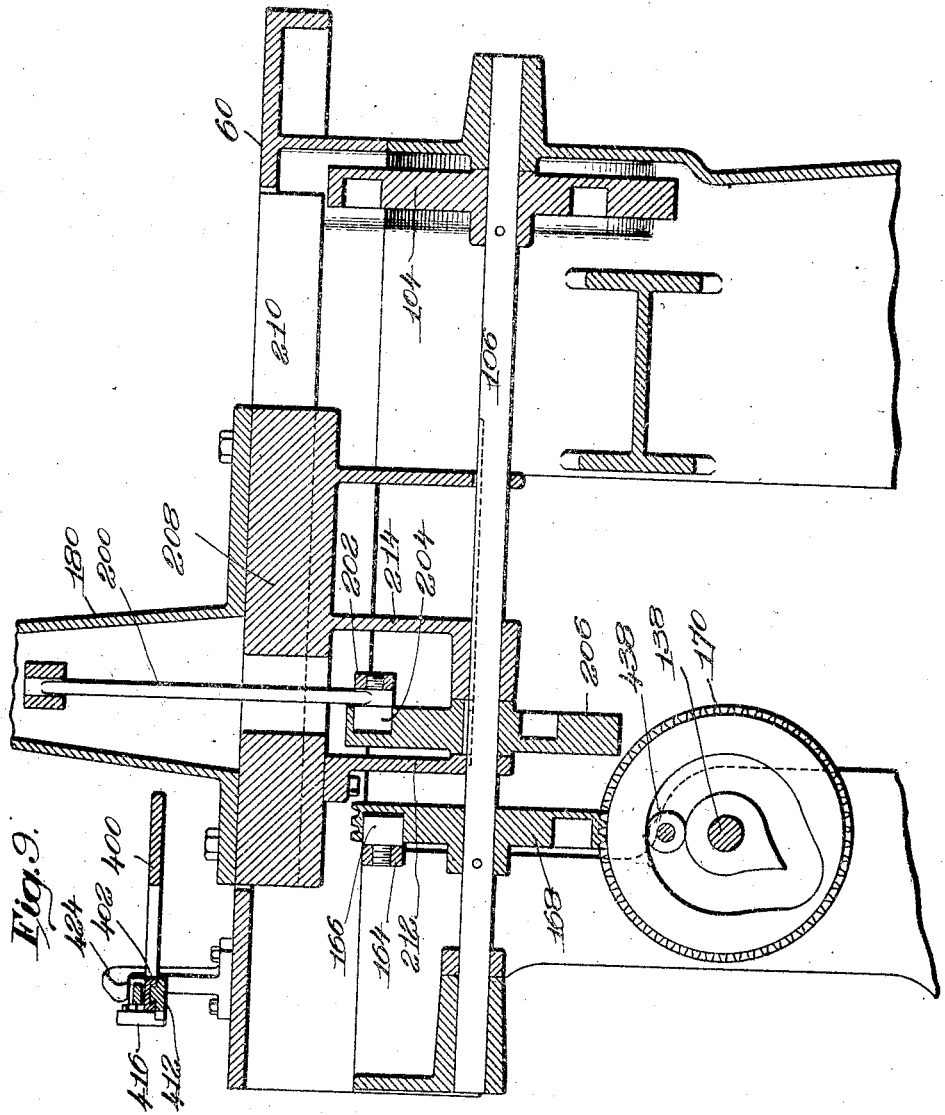

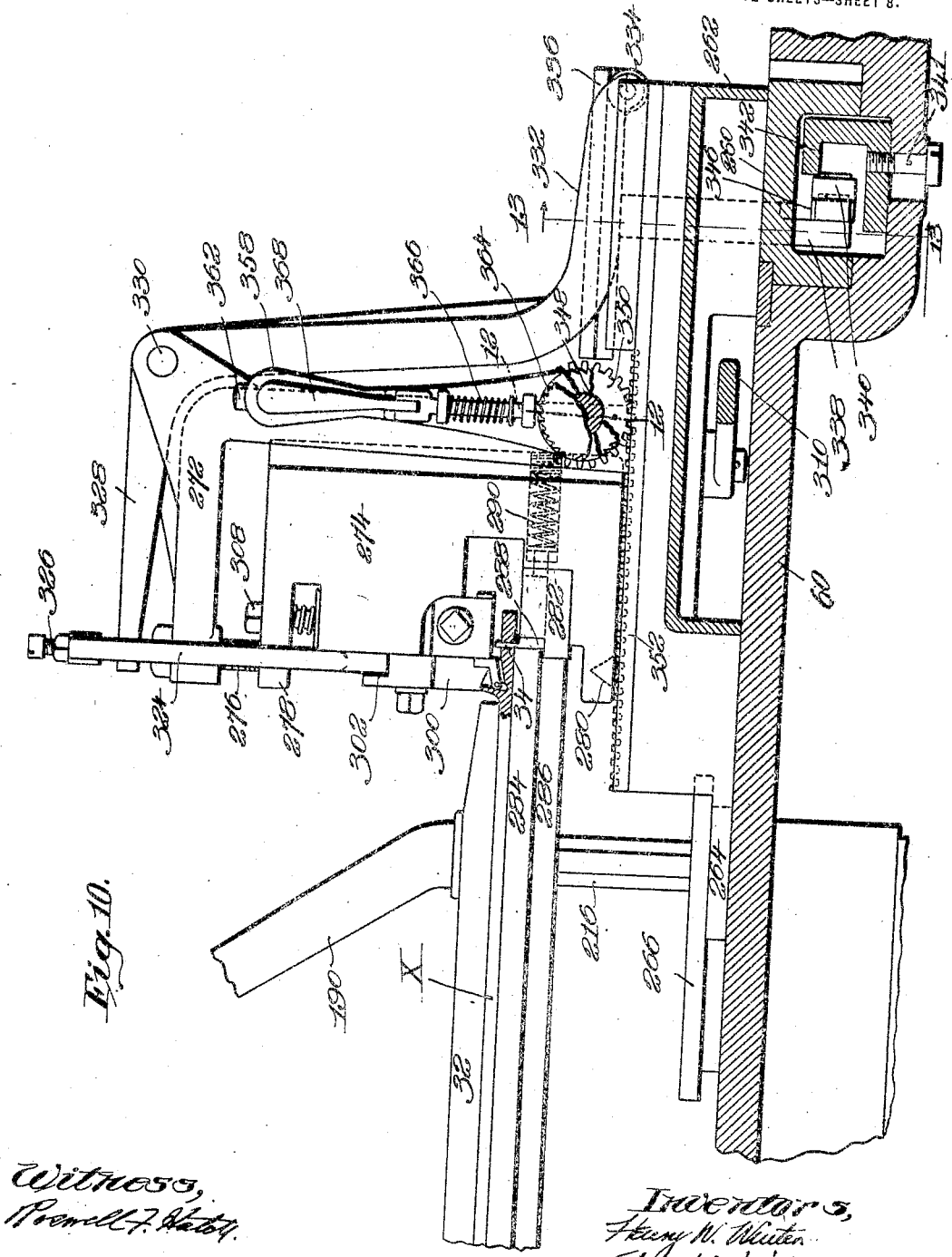

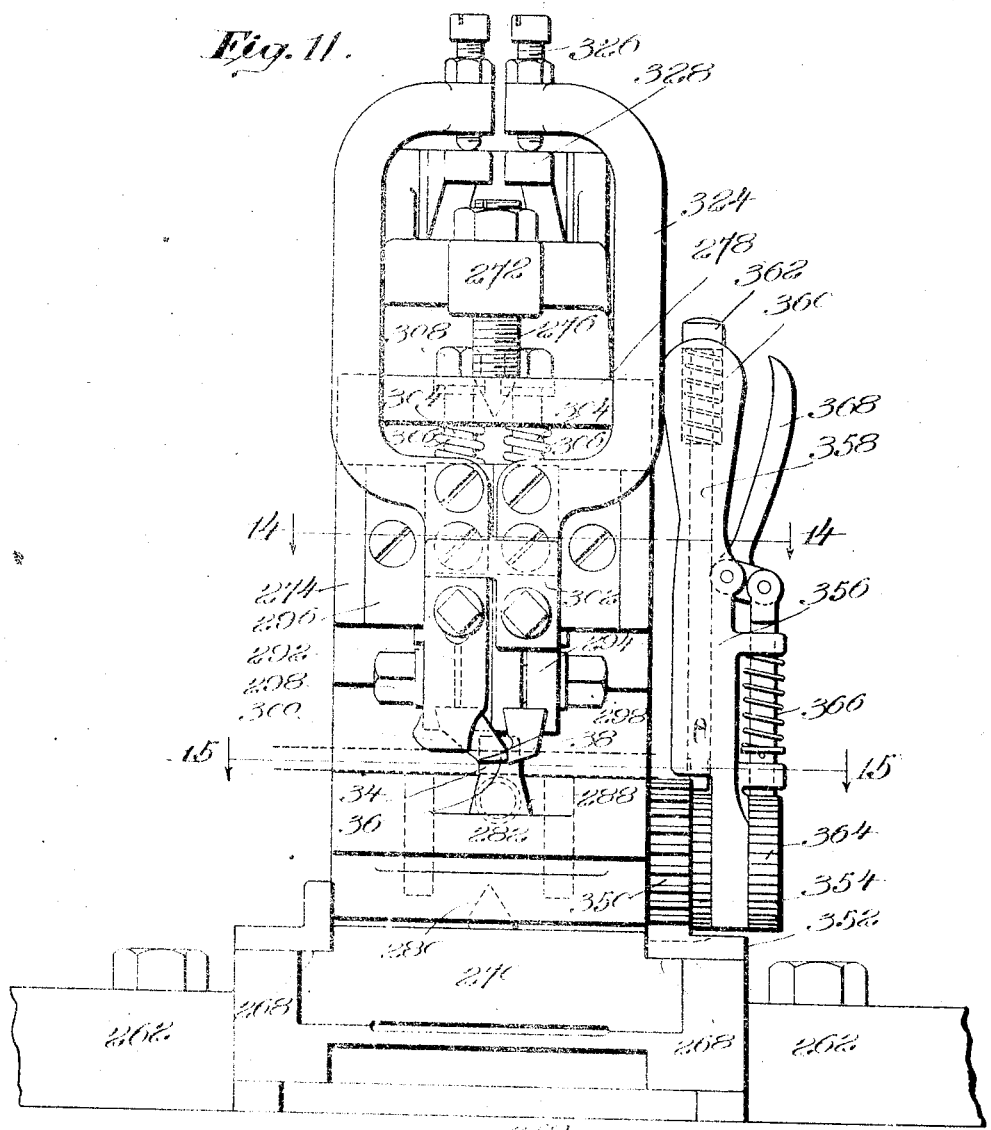

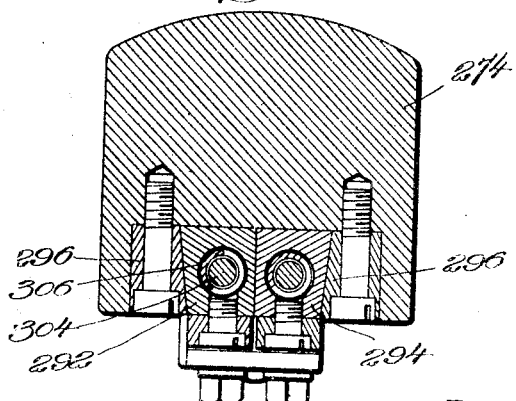
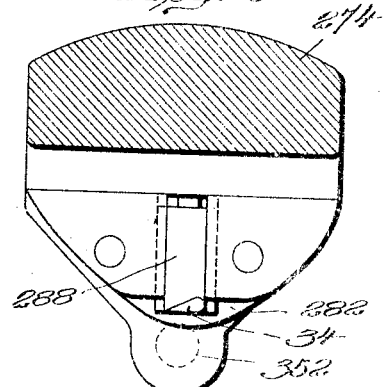
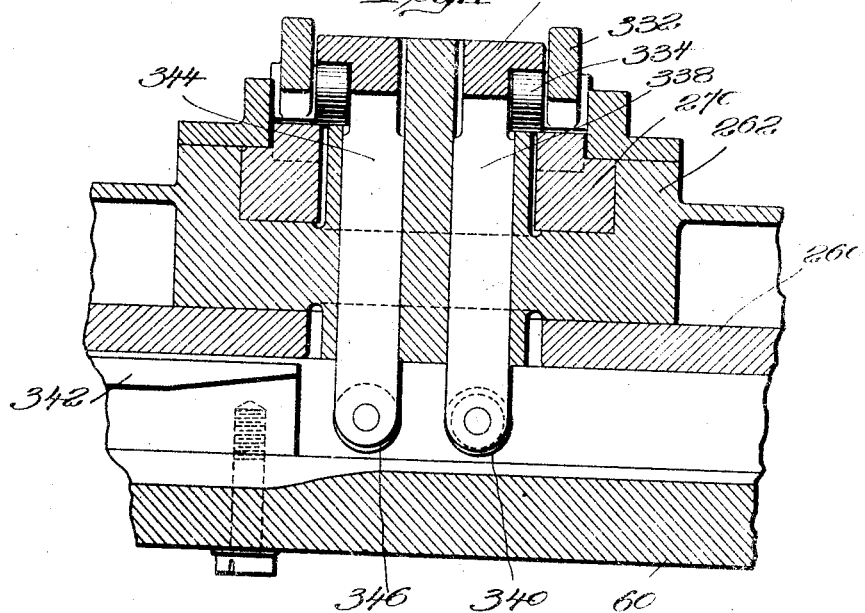

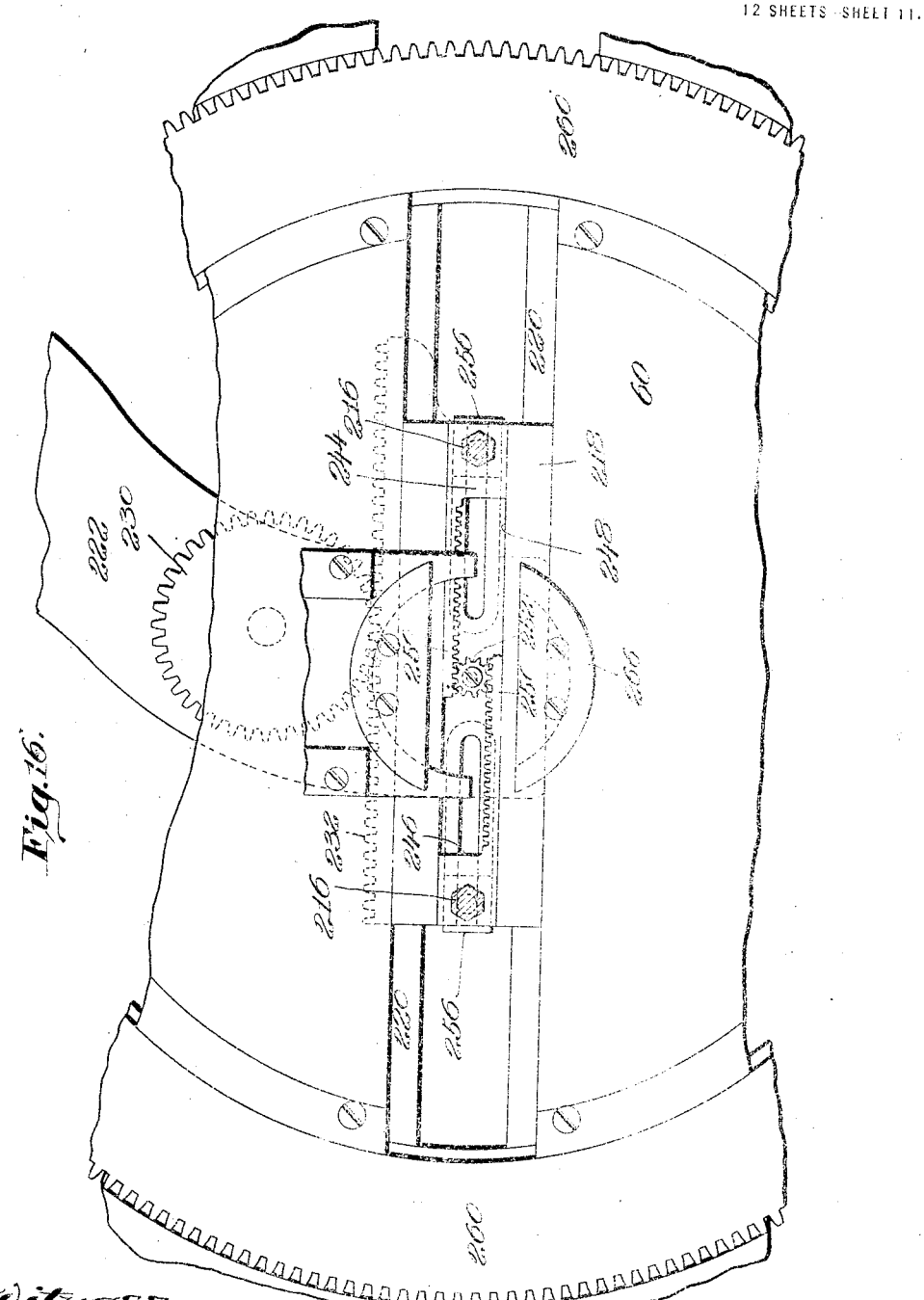

H. W. WINTER & E. W. SMITH.
SOLE PREPARING MACHINE.
APPLICATION FILED JULY 26, 1915.
1,292,979.
Patented Jan. 28, 1919.
12 SHEETS—SHEET 12.
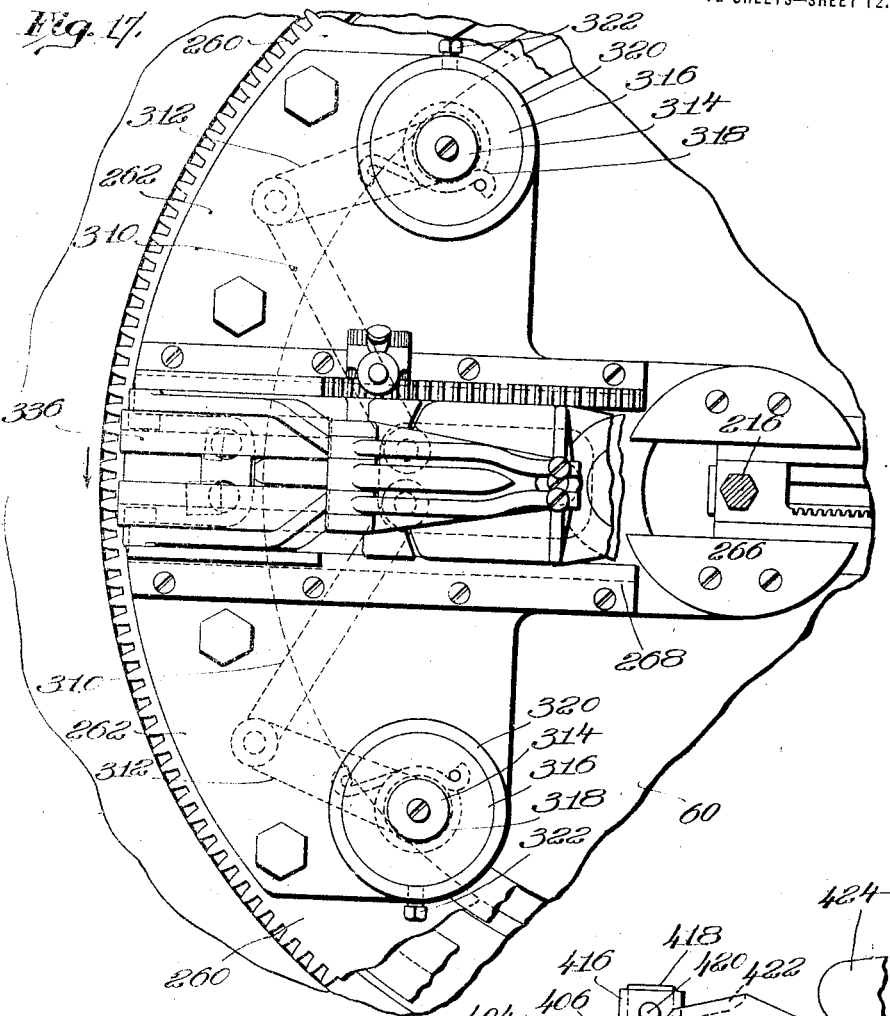
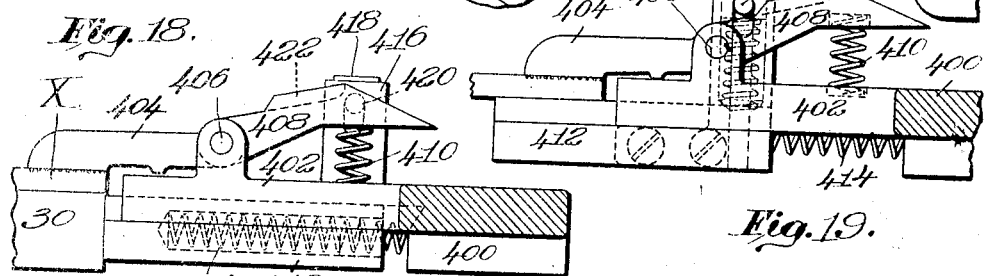
Witness,
Powell F. Haley
Inventors,
Henry W. Winter
Edwin W. Smith
by their attorneys
Fields, Newton & Fish

UNITED STATES PATENT OFFICE.

HENRY W. WINTER, OF METHUEN, AND EDWIN W. SMITH, OF BEVERLY, MASSACHUSETTS, ASSIGNORS, BY MESNE ASSIGNMENTS, TO UNITED SHOE MACHINERY CORPORATION, OF PATERSON, NEW JERSEY, A CORPORATION OF NEW JERSEY.

SOLE-PREPARING MACHINE.

1,292,979.   Specification of Letters Patent.   Patented Jan. 28, 1919.

Application filed July 26, 1915.   Serial No. 41,940.

*To all whom it may concern:*

Be it known that we, HENRY W. WINTER and EDWIN W. SMITH, citizens of the United States, residing at Methuen, in the county of Essex and Commonwealth of Massachusetts, and Beverly, in the county of Essex and Commonwealth of Massachusetts, respectively, have invented certain new and useful Improvements in Sole-Preparing Machines; and we do hereby declare the following to be a full, clear, and exact description of the invention, such as will enable others skilled in the art to which it appertains to make and use the same.

This invention relates to sole-preparing machines and more particularly to such machines for performing one or all of the operations of rounding, channeling, and grooving which are commonly performed upon soles or sole-blanks to fit them for the operation of sewing them to shoe uppers.

One object of the invention is to produce a machine in which the various operations are performed automatically, particularly with respect to the introduction and removal of the sole-blanks, so that the attention of an operator may be necessary only in supplying blanks to the container or magazine with which the machine is provided.

Another object of the invention is to provide a machine of the character described with novel and improved mechanism for producing the relative movements of the sole-clamping devices and the tools, by which the point of engagement of the tools with the sole is transferred around the periphery of the sole.

To the foregoing ends the features of the invention contemplate an arrangement in which sole-blanks are fed automatically, from a supply receptacle, to a position in the clamping or work-holding means of the machine, and in which these clamping means and the mechanism for causing the relative movements of the sole-clamp and the tools are actuated in timed coöperation with the sole feeding means. The invention also includes an arrangement in which the sole-clamp has longitudinal movements, while the tools are revolved around the sole-clamp, these two movements being combined in such a manner that the point of engagement of the tools with the sole is always kept near to the center of revolution of the tools.

Other objects of the invention, and the features of construction by which they are attained, will be set forth hereinafter in connection with the description of the illustrated embodiment of the invention.

The preferred form of the invention is illustrated in the accompanying drawings, in which Figure 1 is a front elevation of a machine embodying the present invention, with a portion of the blank feeding mechanism broken away; Fig. 2 is a right-hand side elevation of the complete machine; Figs. 3 and 4, taken together, constitute a plan view of the entire machine on a larger scale than the preceding figures; Fig. 5 is a detail plan view, on a still larger scale, showing a portion of the blank feeding mechanism; Fig. 6 is a sectional view, on a still larger scale, on the line 6—6 in Fig. 5; Fig. 7 is a vertical section on the line 7—7 in Fig. 1; Fig. 8 is a vertical section on the line 8—8 in Fig. 2; Fig. 9 is a vertical section on the line 9—9 in Fig. 2; Fig. 10 is a detail view showing, in side elevation and partly in vertical section, the means for supporting and actuating the tools; Fig. 11 is a front elevation of the tool supporting devices on a larger scale than Fig. 10; Fig. 12 is a vertical section on the line 12—12, Fig. 10, showing in detail the manually operable means for retracting the tools; Fig. 13 is a vertical section on the line 13—13 in Fig. 10, but on a larger scale than the latter figure; Figs. 14 and 15 are horizontal sections on the lines 14—14 and 15—15 respectively, in Fig. 11; Fig. 16 is a plan view showing particularly the mechanism for supporting the pattern plate; Fig. 17 is a plan view showing the mechanism for supporting and actuating the knives; and Figs. 18 and 19 are detail views showing, in side elevation and in two different positions, the gripper constituting a part of the sole ejector.

The invention is illustrated as embodied in a machine in which sole-blanks or block-soles are rounded, channeled and grooved to prepare them for attachment to the uppers of McKay shoes, although soles for other types of shoes may be prepared by the substitution of proper channeling or grooving tools. As is common in machines for performing work of this character, the illustrated embodiment of the invention is provided with a pattern plate 30 upon which the sole-blank X rests during the operation of the knives thereon, the blank being clamped between the pattern plate and an upper clamp member or plate 32. The operative instrumentalities or tools comprise a rounding knife 34, a channeling knife 36, and a grooving knife 38, which are caused to traverse the periphery of the sole-blank and cut the blank to the required contour and, at the same time, produce a channel and a groove for the reception of stitches in the margin of the sole.

In order to automatically provide the machine with a fresh sole-blank at the proper time, a supply of such blanks is held in a receptacle comprising vertical rods 40, 42, 44 and 46, between which a stack of blanks is supported in a definite longitudinal position as shown in Figs. 2, 3 and 4. The rods 40 are fixed, respectively, to arms 48 and 50 which are mounted to swing horizontally about screws 52 and 54 on the upper extremities of a supporting frame 56. This frame has a base 58 which rests on the horizontal surface of a table 60 constituting a part of the frame of the machine. In order that the blank receptacle may be adjusted in length, in accordance with the length of the sole-blanks to be held by it, the base 58 is adjustably fixed on the table by a screw 62 passing through a slot in the base.

The rods 40 engage the fore parts of the sole-blanks, and to adjust them to blanks of different widths, the arms 48 and 50 are arranged to swing upon the screws 52 and 54, as above described. To fix the arms in adjusted position, a screw 64 passes through a slot in the arm 48 and is threaded into the frame 56. The arm 50 is provided with a segmental gear 66 engaging gear teeth on the arm 48, so that the arm 50 is simultaneously secured in adjusted position. Since relative adjustment of the arms may sometimes be necessary to provide for various styles of soles, the segmental gear 66 is adjustably fixed to the arm 50 by means of a screw 68 (Figs. 2 and 3).

The rod 44 engages the toe ends of the blanks, and in order that it may be adjusted for various lengths and shapes of blanks, it is mounted on a base 70 fixed to the base 58 by a screw 72 passing through a slot in the base 70.

The rods 42 and 46 engage with the heel parts of the blanks and are supported and relatively adjustable in substantially the same manner as in the case of the toe part engaging rods. The rods or gages 44 and 46 determine the transverse position of the blanks preparatory to placing them on the pattern 30.

The rods 40, 42, 44, 46 and a pair of feed fingers 74 and 76 form a magazine for supporting the blanks in a predetermined position for delivery to the pattern plate. The stack of blanks in the magazine is supported, at the bottom, upon the two feed fingers 74 and 76 which serve to deliver them one at a time from the magazine to the pattern plate. These fingers are longitudinally curved, square rods, which are slidably mounted in tubular arms 78 and 80. A spring 82, inclosed within each of the arms, presses the corresponding finger outwardly, this movement being limited, however, by a stop pin 84 movable through a slot in the arm and adapted to engage a block 86 fixed on the side of the arm, as shown in Fig. 5. The fingers are normally in their extreme protruded position and stand, as shown in Figs. 3 and 4, directly beneath the lowermost blank of the stack.

Each of the arms 78 and 80 is provided with a base flange 88, seated upon a curved plate 90 which is integral with the upper end of a lever 92, this lever being pivoted to the frame of the machine at its lower end, so that the lever and the plate may be swung toward and from the clamping devices of the machine. The plate 90 and the base flanges 88 are tongued and grooved together, and have a screw and slot connection, as shown in Fig. 5, so that the arms may be adjusted inwardly and outwardly on the plate; and the plate is also provided with a plurality of parallel grooves, so that the arms may be adjusted laterally to different positions, in accordance with the length of the sole-blanks to be operated upon.

By a swinging movement of the lever 92 the feed arms and the feed fingers are caused to transfer the blanks from the bottom of the stack to a position upon the pattern plate 30. This swinging movement is produced by cam mechanism, and for this purpose the lever 92 is connected, by a link 94, with an arm 96 which depends from one end of a rock shaft 98 journaled on the frame of the machine. From the other end of the rock shaft an arm 100 projects upwardly, and this arm carries a cam roller 102 which coöperates with a cam 104. The cam is mounted on a cam shaft 106, also journaled in the frame of the machine, and this shaft is rotated by means which will be described later.

When the feed arms are swung inwardly, the fingers 74 and 76 support the sole-blank until they come into engagement with the edge of the pattern plate 30, as shown in Fig. 5, and thereafter the fingers remain stationary while the feed arms continue their movement, the sole-blank being thus pushed into position on the top of the pattern plate by engagement of its edges with the ends of the feed arms. At the time of this blank feeding movement, the rounding knife 34 occupies the position shown in Fig. 5, so that it serves as a stop for the far edge of the sole-blank, near the heel end of the blank and opposite the feed arm 80. In order to insure that the blank shall be pressed against the knife at this time, the feed arm 80 is provided with a follower in the form of a slide 108 having a tongue and groove connection with the arm as shown in Fig. 6. This slide is pressed forwardly by a spring 110, while its movement is limited by the engagement of a pin 112 with a recess in the slide. During the last part of the feed movement of the arm 80, the slide 108 presses yieldingly against the edge of the blank, and thus insures movement of the heel part of the blank to proper position on the pattern plate.

The forepart of the sole-blank is positioned on the pattern plate by means shown particularly in Fig. 3. These means comprise two gage fingers 114, in the form of bell crank levers arranged to swing horizontally about pivot screws 116 on a frame 118. A spring 120, connecting the gage fingers, tends to swing them toward each other and the two fingers are articulated together by segmental gear teeth so that they swing simultaneously toward and from each other. Their inward swinging movement is limited, however, by an adjustable stop 122, and this stop is adjusted in accordance with the width of the sole-blanks to be operated upon.

During the rounding and channeling operation the gage fingers 114 are held out of the path of movement of the operating instrumentalities of the machine, in the position shown in Fig. 3, and means are provided for moving them into operative position only during the blank feeding operation above described. For this purpose the frame 118 is mounted upon a slide block 124 which moves in a horizontal slide-way 125 in the table 60. A link 126 is pivoted to the bottom of the slide 124 and connects it with the upper end of a lever 128, this lever being pivotally mounted on the frame of the machine. The lower end of the lever is connected by a link 130, with a distance arm 132, and at the pivotal connection between the link and the arm a cam roller 133 is mounted, this roller working in a cam path 134 on the side of a gear wheel 136. This wheel rotates on a shaft 138 and is actuated by means which will be described later. Associated with the toe gages 114 is a stop 142 which gages the toe end of the sole-blank. This stop is adjustably mounted on a slide 144 which has a screw and slot connection with the frame 118, and this frame also has a screw and slot connection with the slide 124. The slide 124 has a uniform length of reciprocation and at the end of the inward movement, the slide 144 engages the pattern plate 30. The blank is gaged from the toe gage or stop 142, and this gage is always brought into a definite relation to the pattern plate 30. To provide for different sizes of patterns, the slide 144 may be adjusted on the slide 124. The gage 142 is set slightly back from the end of the slide 144 so that, when the blank is in position, its edge will extend beyond the edge of the pattern to allow for the rounding operation.

After the toe gages are moved into engagement with the sole-blank, the sole blank is moved into position longitudinally against the stop 142 by a heel engaging arm 146 shown particularly in Fig. 4. This arm lies normally in a position beyond and below the path of movement of the heel blank, but is moved into operative position as soon as the blank is delivered to the pattern plate. In order that it may be so moved, the arm is mounted at the upper end of a rock shaft 148 which has bearings in the frame of the machine. Directly below the arm 146 a second arm 152 is mounted on the shaft, and this arm is fixed thereto while the arm 146 is free to swing, to a limited extent, upon the shaft. A coil spring 154 connects the two arms and tends to rotate the arm 146 toward operative position. This relative movement of the arms is limited, however, by a stop lug 155 which projects downwardly from the arm 146 into engagement with the rear edge of the arm 152. One of the bearings 150 in which the shaft 148 turns is bifurcated, and a bevel pinion 156 is mounted on the shaft between the upper and lower parts of this bearing, being thus restrained against vertical movement, but being keyed to the shaft so that it may rotate the latter. The pinion meshes with a segmental gear 158, on the lower end of an arm 160 which is pivoted at its upper end, on a stud 162 on the frame of the machine. A second arm 1'4 integral with the arm 160, carries a cam roller 166 which engages a cam path in a skew gear wheel 168 mounted on the cam shaft 106. This gear wheel meshes with a similar gear wheel 170 mounted on the shaft 138, and these gear wheels serve as the means for actuating the cam shaft 106 by power transmitted through the shaft 138.

The vertical movement of the stop arm 146 is produced by means of the arm 152. This arm carries a cam roller 172 at its outer end, and the roller moves upon a cam 174 fixed on the table 60 of the machine. The cam is so shaped that when the arm 152 is swung inwardly by the mechanism above described, the roller rides up on the higher part of the cam, thus raising the arm 152 and the shaft 148, whereby the arm 146 is raised into a position in which its extremity may engage the end of the sole-blank which is being positioned upon the pattern plate When the mechanism swings the arms back to normal position, the descent of the shaft is insured by a spring 176 coiled around it beneath the bearing 150 and pressing against a collar 178 fixed on the shaft.

To support the clamp plate 32 when it is raised, and to press it against the sole-blank during the rounding and channeling operation, the machine is provided with means comprising a hollow arm 180 which overhangs the pattern plate. As shown in Figs. 2 and 4, a slide 182 moves vertically in the end of the arm and is perforated vertically to receive a plunger 184. A spring 186 interposed between the slide and the lower part of the plunger, forces the latter downwardly, but this downward movement is limited when the clamp is not in operation, by stop nuts 188 on the upper end of the plunger. The plunger is connected with the clamp plate by two arms 190, so that, when the slide 182 is in its lowermost position, the pressure of the spring 186 is transmitted through the plunger and the arms to the clamp plate and the latter is pressed against the sole-blank with sufficient force to prevent it from shifting on the pattern plate when subjected to the operation of the knives.

In order that the cam plate may be automatically raised to receive a sole-blank, the slide 182 is connected with the forward end of a lever 192 pivotally mounted in the hollow arm 180, and the rear end of this lever is connected with toggle arms 194 and 196. The arm 196 is integral with an arm 198 which is pivoted to the upper end of a link 200, and the lower end of the link is pivoted to a distance arm 202. At the pivotal connection between the link and the arm, a cam roller 204 is mounted, and this roller works in a path in a cam disk 206, as shown in Fig. 9, this cam disk being mounted on and rotated by the cam shaft 106.

A feature of the operation of the present machine resides in the fact that longitudinal movements are imparted to the sole-blank, and in order to permit the clamping means to perform such movements, the arm 180 is mounted on a slide 208 which moves in horizontal guideways 210 in the table 60 of the machine. Since the cam disk 206 must participate in these movements, it is splined to the shaft 106, as shown in Fig. 9, and is embraced between arms 212 and 214 depending from the slide 208, so that it moves along the shaft to maintain its engagement with the cam roller 204.

The pattern plate 30 is mounted on two posts 216 which are connected at their lower ends with a slide 218 movable in a horizontal slideway 220 formed in the table 60, as shown in Figs. 7 and 16. The slide 208 is provided with an arm 222, of which the forward end is fixed to the bottom of the slide 218, and this arm, together with the slide 208 and the arm 180, constitutes a rigid framework between the ends of which the clamping pressure is directly transmitted, thus relieving the slides from any tendency to cramp in consequence of this pressure.

The slides 208 and 218 are actuated by means including a rack bar 224. This bar slides beneath the table 60 and is provided with rack teeth on its opposite sides. These teeth coöperate on one side with a gear wheel 226 mounted at the bottom of the table, and this gear wheel meshes, in turn, with rack teeth 228 at the bottom of the slide 208, as shown particularly in Fig. 7. The other side of the rack bar 224 coöperates with a gear wheel 230, which meshes with rack teeth 232 on the forward end of the arm 222 so as to actuate the slide 218. By the arrangement just described, the two slides are moved equally and in unison, so that all tendency to cramp is avoided.

The rack bar is connected at one end, as shown particularly in Fig. 8, with a lever 234 pivoted at its lower end on the frame of the machine, and to this lever is pivoted a link 236, the other end of the link being pivoted on the upper end of a distance arm 238. At the pivotal connection between the link and the arm a cam roller 240 is mounted, and this roller, as shown in Fig. 7, engages a path in a cam 242 fixed to the side of the gear 136. In order that the amplitude of the movements imparted to the rack bar may be varied in accordance with the length of the sole-blanks which are being operated upon, the lever 234 is provided with a series of holes 235 into which the pivotal connection between the lever and the link may be shifted.

The posts 216 support the pattern plate near its toe end and its heel end, and the distance between these posts must be varied in accordance with the length of the pattern plate employed, while it is desirable in all cases to keep the center of the length of the pattern co-incident with the middle of the clamp plate. Accordingly, the posts are mounted on two slides 244 and 246, which move in a guideway 248 at the top of the slide 218, as shown particularly in Fig. 16. The slides 244 and 246 are provided with integral racks 250 meshing on opposite sides with a pinion 252 mounted at the middle of the slide 218, and this arrangement is such that the slides 244 and 246 are movable toward and from each other, but are always held equi-distant from the middle of the slide 218. In order that the posts may be fixed in adjusted position, they are provided at their lower ends with screw-threaded reduced portions 254, which pass loosely through openings in the slides 244 and 246 and engage nuts 256 movable in T-slots formed in the slide 218. The posts are hexagonal in cross-section in the middle portions, and they may thus be turned with a wrench to tighten the nuts 256, and thus clamp the parts securely in position.

The knives are revolved around the sole-blank by means including an annular gear 260 which turns in a recess in the top of the table 60. As shown in Figs. 10, 11 and 17, a carrier, part 262, which may be described as the "knife carrier" is fixed to the gear 260 and revolved thereby over the top of the table 60 and around the pattern plate. To brace the knife carrier, it is formed, at its inner extremity, with an arcuate bearing member 264, which engages two segmental flanged bearing members 266 fixed at the center of the table. The knife carrier at the beginning of the operation is in a position with the knife 34 against the sole at the point shown in Fig. 5. When operating upon the sole, the knife carrier makes a complete revolution from the point shown in Fig. 5, around the sole and back to this point. After complete revolution of the knife carrier, the longitudinal reciprocation of the pattern slide 218 carries the blank past the point illustrated in Fig. 5, after the knife 34 has come to a rest, and then returns it to this point again to give an over-feed of the blank and to make a smooth joint at the finish.

The knife carrier 262 is provided with a guideway 268 in which a slide 270 moves horizontally. This slide forms part of a framework which may be described as the "knife-support." An overhanging arm 272 rises integrally from the slide 270 and supports a knife-block 274. This block is pivoted on the knife-support at its upper end by a pivot screw 276 threaded in the end of the arm 272 and having a conical lower end engaging a conical recess in a lug 278 on the knife-block. The lower end of the block is similarly mounted on a conical pivot 280.

The horizontal movement of the knife support is provided in order that the knives may be moved inwardly and outwardly to conform to the contour of the pattern plate, and this movement is regulated by the engagement with the edge of the plate, of a follower 282 which is mounted at the lower part of the knife-block and provided with a rounded surface, as shown in Fig. 15, for engagement with the pattern plate. The edge of the pattern plate is divided into upper and lower portions 284 and 286, the lower portion only being engaged by the follower 282. This division of the edge is provided in order that the channeling and grooving knives may be guided, to some extent, independently of the rounding knife, whereby the distance of the channel and the groove from the rounded outline of the sole may be varied in different parts of the sole, as is usually desirable, the rounding knife being independently guided by the upper part 284 of the edge of the pattern plate. To permit this independent movement of the rounding knife, the shank 288 of the knife is arranged to slide in a dovetailed guideway in the upper surface of the follower 282, and it is pressed outwardly and into engagement with the pattern plate by a spring 290. Accordingly, the rounding knife is held in engagement with the surface 284 on the pattern plate regardless of the movements of the follower 282 and the knife-block.

As shown particularly in Figs. 11 and 14, the channeling knife 36 and the grooving knife 38 are provided with horizontally disposed shanks of dovetailed cross-section, which are adjustably clamped in the split lower ends of two slides 292 and 294. These slides move vertically in a dovetailed guideway formed in front of the knife-block 274, by removable bearing members 296. The knives may be adjusted horizontally upon loosening the clamp screws 298 by which the shanks of the knives are fixed in the knife slides.

To limit the depth to which the channeling and grooving knives cut into the sole-blank, a presser foot 300 is arranged to bear upon the upper surface of the work in advance of the channeling knife, this presser foot being secured to the front of the knife slide 292 by a screw and slot connection, as shown in Fig. 11, so that it may be adjusted vertically. The presser foot directly sustains the slide 292 and the channeling knife, and, in order that it may also support the slide 294 and the grooving knife, a plate 302 is adjustably fixed to the front of the slide 294, this plate having a portion which overhangs and engages the upper end of the presser foot, as shown in Fig. 11. This arrangement is such that the grooving knife may be raised from the work, by means hereinafter described, without raising the channeling knife, this being desirable in some cases where the groove is interrupted at the toe end of the sole while the channel is formed continuously.

Each of the knife slides is provided with an upwardly projecting stud 304, about which is coiled a spring 306 tending to force the slide downwardly and hold the knife in engagement with the work. The heads 308 of the studs limit this downward movement, where there is no work beneath the knives, by engagement with the knife-block.

The inward movement of the knife carrier, by which the follower 282 is kept pressed against the pattern plate, is produced by means shown particularly in Fig. 17. Two links 310 are pivoted to the bottom of the slide 270 and these links are pivoted, in turn, to arms 312 projecting from studs 314 which turn in spring drums 316. A spring 318 is coiled around each of the studs, one end of the spring being attached to the corresponding arm 312 and the other to the spring drum. The drums are mounted in sleeves 320 forming parts of the knife carrier 262 and are fixed therein by set screws 322. By rotation of the spring drums in the sleeves, the tension of the springs may be adjusted as required. The springs tend to rotate the studs and swing the arms 312 in a direction to press the slide 270 toward the center of the machine, and the relation of the arms and the links is such that the mechanism tends to compensate for the diminishing tension of the springs as the slide moves inwardly, so as to maintain a substantially uniform pressure of the follower against the pattern plate.

In order to lift the knife slide 294 and the grooving knife from the work when necessary, a yoke-shaped member 324 is fixed at its lower end to the knife slide and provided at its upper end with a screw 326 which engages the forward end of an arm 328. This arm constitutes a part of a bell crank lever which is pivoted at 330 on the arm 272 of the knife support. The other arm 332 of the bell crank lever projects downwardly and rearwardly and is provided with a roller 334 which rests beneath a flanged bar 336. This bar is fixed to the upper end of a plunger 338 which slides vertically in a bearing in the knife carrier and projects downwardly into the space beneath the annular gear 260, as shown particularly in Figs. 10 and 13. A cam roller 340 is mounted on the lower end of the plunger 338, and this roller coöperates with a flanged cam 342 of Figs. 3 and 13, which is mounted on the table 60 beneath the gear 260. This cam is so located as to be engaged by the roller 340 when, in the rotation of the gear 260, the grooving knife reaches the toe portion of the sole. The portion of the toe not acted upon by the grooving knife is indicated on the finished sole shown in Fig. 4. When the cam is so engaged, it depresses the cam roller and the plunger which, in turn, cause the bar 336 to depress the roller 334 and swing the bell crank lever in a direction to press upwardly on the screw 326, and thus raise the yoke 324 and the knife slide 294 and disengage the grooving knife from the work. Owing to the yoke-shape of the member 324, and to the location of the screw 326 near the pivotal axis of the knife-block, these connections do not interfere with the free swinging of the knife block to conform to the outline of the pattern plate, and the connections between the bell crank lever and the plunger 338 are such as not to be affected by the sliding movements of the knife support.

Some manufacturers continue the stitching around the toe of the shoe, in which case the grooving knife is not rendered inoperative at that portion of the sole. In order that the grooving knife may not be affected by the cam 342, the cam is secured to the table 60 by a screw and slot connection 341 so that it may be moved radially out of the path of the roll 340 to the position shown in Figs. 3 and 10.

In the case of some soles no channel is produced at the heel extremity and, accordingly, it is desirable when this part of the sole is reached, to raise both the channeling and grooving knives out of operative position. Accordingly, means are provided for raising the channeling knife, these means being in every substantial respect identical with those employed for raising the grooving knife and comprising a plunger 344 located alongside the plunger 338, as shown in Fig. 13, and provided at its lower end with a cam roller 346. The roller 346 does not extend outwardly as far as the roller 340, however, as shown in Fig. 10, so that it is never affected by the cam 342. A second flanged cam 343 (Fig. 4) which extends angularly below the annular gear 260 throughout the portion which controls the action of the knives on the heel portion of the sole, acts on the roll 346, so that the channel and groove are discontinued at this time, as indicated on the sole illustrated in Fig. 4. In this way the machine may be arranged to automatically interrupt either the groove alone, or both the channel and the groove, as may be necessary in the production of the particular kind of sole which is required. In some classes of work the cam 342 may be moved out of the path of the roller 340 so that both channel and the groove will be made on the toe portion of the sole. In turn work, cams 342 and 343 would be rendered inoperative, so that a channel would be formed around the entire periphery of the sole.

To permit the operator to retract the knives when changing the pattern plate, or at any other time when it may be desirable, manually operable means are provided for this purpose, as shown particularly in Figs. 10, 11 and 12. A stud 348 is fixed in the side of the knife supporting arm 272, and a pinion 350 rotatable about the stud, meshes with rack teeth on one of the retaining flanges 352 of the guideway 268. Fixed to the side of the pinion is a toothed disk 354. A hand lever 356 is pivoted loosely on the stud 348 and provided with a plunger 358, of which the lower extremity is adapted to coöperate with the teeth of the disk 354. A spring 360 presses against a button 362 at the upper end of the plunger and holds it normally in inoperative position, but when the knives are to be retracted, the operator presses upon the button and then rocks the lever, thus rotating the gear 350 and retracting the slide 270. In order to retain the slide in retracted position, the head of the stud 348 is provided with ratchet teeth 364, and the hand lever 356 carries a spring-pressed latch 366 which coöperates with the ratchet teeth. This latch may be released, when necessary, by a trigger 368. It will be noted that the ratchet teeth 364 prevent the knife carrier from moving toward the pattern, but they will permit the carrier to be pushed back if the pattern comes into engagement with it.

The annular gear 260 is rotated by engagement with a pinion 370 (Figs. 4, 7 and 8) which is fixed on the upper end of a shaft 372. The lower end of this shaft turns in a bracket 374 on the frame of the machine and is provided with a bevel pinion 376. This pinion meshes with a pinion 378, which is mounted loosely on a drive shaft 380. This shaft is rotated constantly and it carries a pinion 388 which drives the gear 136, and through it the two cam shafts of the machine, by the connections above described. These cam shafts perform one rotation for each complete cycle of operations of the machine. The revolution of the gear 260 and the parts carried by it must be intermittent, and, accordingly, the pinion 378 is connected with the shaft 380 by a clutch of the well-known Horton type. The construction of this clutch need not be described, but it will be understood that its operation is such that it may be held out of operation by the action of a detent 384, thus permitting the shaft 380 to rotate without driving the pinion 378. When the detent is moved out of engagement with the clutch, the pinion 378 will be rotated until the detent is again moved into operative position. The detent forms the lower end of a lever pivoted upon the bracket 374 and carrying a cam roller 386 at its upper end, and the roller works in a cam path in the cam 242, this path being formed to throw the Horton clutch into and out of operation at the proper times in a cycle of operations of the machine.

In order to actuate the drive shaft 380, it is connected by skew gears 390 with a power shaft 392. The power shaft carries a pulley 394 by which it may be connected with any suitable source of power, and the pulley is connected with the shaft by clutch mechanism of any ordinary or suitable form, controlled by a hand lever 396 at the front of the machine whereby the machine may be thrown into and out of operation.

After the completion of the operations on a sole-blank, it is removed automatically from the pattern plate and discharged from the machine by means which will now be described. A rock shaft 398 is journaled vertically in the frame of the machine and projects through the table 60. At the upper end of this shaft an arm 400 is fixed, and this arm has a forwardly bent extremity 402 provided with a sole gripper, which is shown particularly in Figs. 9, 18 and 19. The gripper comprises an upper jaw 404 which is mounted on a pivot 406 in ears projecting upwardly from the part 402 and which is serrated on its lower surface to enable it to grip the material of the sole. The jaw 404 has a rearwardly projecting arm 408 by which its operation is controlled, and a spring 410 presses upwardly against this arm and tends to hold the jaw in operative position. The lower gripper jaw is in the form of a slide 412 which has a dovetailed connection with the part 402 (see Fig. 9). This slide is pressed forwardly by a coiled spring 414, so that it tends to assume the position of Fig. 19 in which it is beneath the upper jaw so that a sole may be gripped between the jaws.

The slide 412 has at one side an upwardly projecting sleeve 416 in which a spring-pressed plunger 418 is vertically movable, this plunger being provided with a pin 420 which projects laterally through a slot in the sleeve. The arm 408 has a cam-like flange 422 which projects laterally into the path of movement of the pin 420. When a sole is to be removed by the ejector, the arm 400 is swung forwardly and the parts of the gripper are then in the position of Fig. 19. The slide 412 is brought by this swinging movement into engagement with the heel end of the pattern plate, as shown in Fig. 18, and since the slide projects beyond the upper jaw, it is caused to have a rearward sliding movement by this engagement before the upper jaw has reached the sole on the pattern plate. This rearward sliding movement causes the pin 420 to ride over the flange 422, thus depressing the arm 408 and raising the upper jaw, and by the continued swinging movement of the arm 400, the upper jaw is brought into position above the sole. Finally, by the continued movement of the slide, the pin 420 is moved beyond the rear end of the flange 422, thus disengaging it and permitting the spring 410 to force the upper jaw down against the sole, as shown in Fig. 18. The arm 400 is then swung back again, and during the first part of this movement the upper jaw drags the sole with it, while the lower jaw or slide is projected again by the spring 414, so that when the upper jaw has been moved entirely away from the pattern plate, the sole is gripped between the two jaws. In this manner the sole is carried to the position of that shown at the left of Fig. 4, but when the arm 400 reaches its normal position, the beveled rear extremity of the arm 408 is brought into engagement with a trip device 424, which depresses the arm and opens the gripper, thus permitting the sole to fall into a recess 426 in the table 60 from which it may be removed.

In order to impart the necessary rocking movements to the shaft 398 by which the ejector arm is actuated as above described, this shaft is provided, as shown in Fig. 8, with a pinion 428 which meshes with a segmental gear 430 on the lower end of an arm 432. This arm is mounted to swing on a stud 434 on the frame of the machine, and a second arm 436 integral with the arm 432, carries a cam roller 438 which works in a cam slot formed in the face of the gear 170.

In order that the shoe soles produced by the machine may be conveniently marked with size numbers or other designations, a marking wheel 440 is mounted in a slot in the clamp plate 32, as shown in Figs. 1 and 4, this wheel being provided with types on the periphery and being rotatable to bring the different types into operative position. Accordingly, when the clamp is pressed down against a sole-blank, the blank is marked with the type which is in operative position. A spring-pressed pin 442 retains the type wheel in the position to which it is set.

Nothing herein contained is to be interpreted as limiting the invention in the scope of its application to use in connection with the particular machine, or the particular mode of operation, or both, selected for purposes of illustration and explanation. While the particulars of construction herein set forth are well suited to one mechanical form of the invention, it is not limited to these details of construction nor to the conjoint use of all its features, nor is it to be understood that these particulars are essential, since they may be variously modified within the skill of the artisan without departing from the true scope of the actual invention, characterizing features of which are set forth in the following claims by the intentional use of generic terms and expressions inclusive of various modifications.

Having described the preferred form of the invention, what is claimed as new is:—

1. A sole-preparing machine having, in combination, a tool for operating on the marginal portion of a sole blank, means for revolving the tool around the sole blank, and means for supporting the sole blank and for moving it longitudinally in timed coöperation with the tool, so as to bring the end portion of the blank near the center of revolution of the tool when this portion is reached by the tool.

2. A sole-preparing machine having, in combination, a tool for operating on the marginal portion of a sole blank, means for revolving the tool around the sole blank and for moving it toward and from the center of revolution to conform to the contour of the blank, and means for supporting the sole blank and for moving it longitudinally in timed coöperation with the tool, so as to bring the end portion of the blank near the center of revolution of the tool when this portion is reached by the tool.

3. A sole-preparing machine having, in combination, a tool for operating upon the marginal portion of a sole blank, a device for holding the blank in operative position, automatic means for relatively moving the tool and sole blank to transfer the point of operation of the tool around the blank, and means for moving the blank longitudinally of the path of the point of operation of the tool, during the marginal operation.

4. A sole-preparing machine having, in combination, a tool for operating upon the marginal portion of a sole blank, a pattern for supporting the blank, means for moving the tool in a fixed path about the pattern, and means for moving the pattern in timed coöperation with the tool to hold the edge of the blank in the path of the tool.

5. A sole-preparing machine having, in combination, a tool for operating upon the marginal portion of a sole blank, means for continuously moving the tool in a closed path while operating upon the sole blank, a pattern for supporting the blank, and means for reciprocating the pattern during the operation of the tool.

6. A sole-preparing machine having, in combination, a tool for operating on the marginal portion of a sole blank, a pattern for supporting the blank, means for revolving the tool around the blank, means for reciprocating the pattern across the path of the tool, and means movable with the pattern for pressing the blank against the pattern.

7. A sole-preparing machine having, in combination, a tool for operating on the marginal portion of a sole blank, means for moving the tool in a fixed path about the blank, a support for the blank, means for reciprocating the support in a rectilinear path during the operation of the tool, and means for varying the length of the path of travel of said support for different sizes of blanks.

8. A sole-preparing machine having, in combination, a tool for operating on the marginal portion of a sole blank, a pattern for supporting the blank, means for relatively moving the tool and the pattern to transfer the point of operation of the tool from a fixed point on the blank around the periphery of the blank and back to said point, and means thereafter to move the pattern relatively to the tool to traverse the blank past said point, to give an over-feed and provide a smooth margin at the finish.

9. A sole-preparing machine having, in combination, a support for a sole blank, a tool for operating on the marginal portion of the blank, means for relatively moving the tool and blank to transfer the point of operation of the tool around the blank, and means for reciprocating the support during the operation of the tool to bring the end portion of the blank near the center of motion of the tool when this portion is reached by the tool, and to give an over-feed of the tool from the starting point of the tool.

10. A sole-preparing machine having, in combination, a tool for operating upon the marginal portion of a sole blank, means for moving the tool in a closed path from a fixed point and back to that point, and means to reciprocate the support within the path of the tool to carry the blank past the tool and back to give an over-feed of the blank from the starting point of operation of the tool.

11. A sole-preparing machine having, in combination, a movably mounted pattern for supporting a sole blank, a movably mounted clamp for pressing the blank upon the pattern, a tool for operating on the marginal portion of the blank, means for moving the tool while operating on the blank, and means for reciprocating the clamp and pattern in unison in a rectilinear path during the operation of the tool.

12. A sole-preparing machine having, in combination, a tool for operating on the marginal portion of a sole blank, a pattern mounted upon a slide for supporting the blank, a clamp mounted upon a slide for pressing the blank against the pattern, means for moving the tool in a circular path about the pattern, means for reciprocating the pattern upon the diameter of the tool path, and means for reciprocating the clamp slide in unison with the pattern slide.

13. A sole-preparing machine having, in combination, a slidably mounted pattern for supporting a sole blank, a clamp for pressing the blank upon the pattern, a slide for supporting the clamp, means on the slide for moving the clamp into and out of clamping position, a tool movable about the pattern for operating upon the marginal portion of the sole blank, and means for reciprocating the pattern and clamp during the operation of the tool.

14. A sole-preparing machine having, in combination, a magazine for holding a stack of sole blanks, a pattern for supporting a sole blank, means for feeding blanks from the magazine to the pattern, a clamp for holding the sole upon the pattern, and a tool for operating on the marginal portion of the blank while it is clamped upon the pattern.

15. A sole-preparing machine having, in combination, a magazine for holding a stack of blanks, a support for the blanks, carriers for delivering blanks from the magazine to the support and for supporting the blanks in the magazine, and means for adjusting the carriers for different sizes of blanks.

16. A sole-preparing machine having, in combination, means for supporting a sole blank, a magazine for holding a stack of blanks, means for automatically transferring blanks from the magazine to the support, a tool for operating on the marginal portion of the blank, and means for automatically transferring the blank from the support to a receptacle after being operated upon.

17. A sole-preparing machine having, in combination, a support for a sole blank pattern, a magazine for holding a stack of blanks having adjustable sides for positioning different sizes of blanks, a tool for operating upon the edge and upper marginal portion of a blank, and means for transferring blanks from the magazine to the pattern, and means to adjust said support to receive patterns for different sizes of blanks.

18. A sole-preparing machine having, in combination, a pattern for supporting a sole blank, a magazine for holding a stack of blanks, means for automatically transferring blanks from the magazine to the pattern, and a tool for operating on the marginal portion of the blank coöperating with the pattern for locating the edge of the blank upon the pattern.

19. A sole-preparing machine having, in combination, a pattern for supporting a sole blank, means for automatically delivering blanks to the pattern, means for automatically positioning a blank upon the pattern, means for clamping a blank upon the pattern, means for withdrawing the positioning means from the clamped blank, and means controlled by the outline of the pattern for channeling the marginal portion of the sole.

20. A sole-preparing machine having, in combination, means for supporting a sole blank, means for placing the blank upon the supporting means, and mechanism for positioning the blank upon the support comprising a side gage, an end gage, and a plurality of arms for engaging the sides of the blank to additionally center it.

21. A sole-preparing machine having, in combination, a support for a sole blank, means for automatically placing the blank on the support, a toe gage for positioning the sole, and means for engaging the heel of the blank to force it into position against the toe gage.

22. A sole-preparing machine having, in combination, a pattern for supporting a sole blank, a toe gage for positioning the blank, normally withdrawn from the pattern, means for placing the blank upon the pattern, means for moving the toe gage into gaging position, and a device for pushing the blank into engagement with the toe gage.

23. A sole-preparing machine having, in combination, a support for a sole blank, and means for positioning the blank upon the support comprising, a side gage, a toe gage, a centering device, a heel engaging device, means to advance the toe gage to a predetermined point, and means for operating the heel engaging device to bring the blank against the toe gage.

24. A sole-preparing machine having, in combination, a support for a sole blank, means for placing the blank upon the support, a sole positioning means comprising a gage for the toe end of the blank and a sole centering device, and a yieldable heel engaging arm for positioning blanks of various sizes within the centering device and against the toe gage.

25. A sole-preparing machine having, in combination, a pattern for supporting a sole blank, and means for positioning the blank upon the pattern comprising, a toe gage movable to and from a fixed position on the pattern and a heel engaging arm movable toward and from the toe gage, the distance of travel of said arm depending upon the size of the sole, and means for operating said parts.

26. A sole-preparing machine having, in combination, a pattern for supporting a sole blank, means for positioning the blank upon the pattern comprising, a toe gage, a slide for moving into and out of gaging position, means to move the slide through a uniform distance when placing the gage in position on the pattern, and means for adjusting said gage for a constant relation for the various sizes of patterns.

27. A sole-preparing machine having, in combination, a support adjustable for holding different sizes of patterns for sole blanks, a toe gage for positioning the sole on the pattern, means for moving the gage into a definite relation with the pattern. means for adjusting the gage to maintain this relation for the different sizes of patterns, and means for operating on the sole.

28. In a sole preparing machine, a sole positioning device comprising, means for positioning one end of a sole, and a sole centering gage for the other end of the sole, said gage having a pair of arms for contacting the opposite edges of the sole connected for movement in unison, and means for adjusting one of said arms relatively to the other.

29. In a sole preparing machine, a sole positioning device comprising means for longitudinally and transversely positioning one end of a sole, and a sole centering gage for the other end of the sole, said gage having a pair of arms for contacting the opposite edges of the sole, means for moving said arms in unison to position the sole, and means by which one of said arms may be adjusted relatively to the other.

30. In a sole preparing machine, a sole positioning device comprising a sole centering device for one end of a sole, and a sole centering gage for the other end of the sole,
said gage having a pair of arms for contacting the opposite edges of the sole, a gear connection between said arms to move them in unison, and an adjustable section in one of said arms by which the arm may be set to shift the centering line transversely of the gage.

31. A sole-preparing machine having, in combination, a pattern for sole blanks, a positioning device for each end of a blank to position the blanks relatively to the pattern comprising an end gage for longitudinally positioning a sole, a sole centering gage having a pair of arms for contacting the opposite edges of the blank which are connected for movement in unison, and means to relatively adjust said arms to vary the final centered position of the sole.

32. A sole-preparing machine having, in combination, a support for a sole blank, a tool carrier mounted adjacent said support, rounding, channeling, and grooving tools on said carrier for operating upon the blank, and means connected with each of said tools for placing them separately into and out of operation upon the blank during the operation of the machine.

33. A sole-preparing machine having, in combination, a support for a sole blank, a tool carrier adjacent the blank, channeling and grooving tools mounted upon said carrier, means for relatively moving the support and carrier to transfer the point of operation of said tools around the blank, and means for withdrawing said tools out of operative position independently of each other during the operation of the machine.

34. A sole-preparing machine having, in combination, a support for a sole blank, a tool carrier, a channeling tool, and a grooving tool mounted upon said carrier for operating upon the marginal portion of the blank, means for relatively moving the support and carrier to transfer the point of operation of the tool around the blank, and means for automatically withdrawing the grooving tool from the blank when operating upon the toe portion of the blank while the channeling tool remains in operation upon the work.

35. A sole-preparing machine having, in combination, a support for a sole blank, a tool carrier adjacent the support, channeling and grooving tools mounted on said carrier, means for relatively moving the support and carrier to transfer the point of operation of said tools around the blank, and means for automatically withdrawing said tools which are constructed and arranged to withdraw both of the tools simultaneously and to withdraw one of the tools from operation upon the blank while the other continues in operation.

36. A sole-preparing machine, having in combination, a pattern for supporting a sole blank, a plurality of tools supported on a carrier for channeling the marginal portion of one face of the blank, means for moving the carrier in a closed path about the pattern, means for forcing the carrier against the pattern with a uniform pressure, and means for reciprocating the pattern across the path of the tools.

37. A sole-preparing machine having, in combination, a pattern, a magazine for supporting a plurality of sole blanks in a pile comprising, toe and heel gages for determining the transverse position of the sole relative to the pattern, and centering gages at the toe and heel ends for determining the longitudinal position of the sole relative to the pattern.

38. A sole-preparing machine having, in combination, a pattern, a magazine for supporting sole blanks comprising, gages for determining the transverse position of the sole relative to the pattern, centering gages for determining the longitudinal position of the sole relative to the pattern, and means for adjusting each of the gages for positioning different sizes of soles.

39. A sole-preparing machine, having, in combination, a pattern, a magazine for supporting a sole blank in a pile comprising, gages to determine the transverse position of the sole relative to the pattern, centering devices having arms for contacting opposite edges of the sole to determine the longitudinal position of the sole relative to the pattern, and means for relatively adjusting the arms for operating on different styles of soles.

40. A sole-preparing machine having, in combination, a support for sole blanks, means for clamping the blank upon the support, means for operating on the marginal portion of the blank, means for automatically removing the blank from the support comprising, an arm movable toward and away from the support having a sole gripping device operated by contact with the support for withdrawing the blank from the support, and means for releasing the blank from the gripping device after it is withdrawn from the support.

41. A sole-preparing machine having, in combination, means for supporting and operating upon the marginal portion of a sole blank, and a blank removing device comprising, an arm movable toward and away from the support, a sole gripping device on said arm having one jaw operated by contact with the support and another jaw for pulling the blank off the support, means to place the first named jaw into coöperation with the last named jaw as the blank is removed from the support, and means for releasing the blank from the jaws when it has been withdrawn from the support.

42. A sole rounding machine having, in combination, a pattern for supporting a sole blank, a rounding knife for operating on the marginal portion of the blank, a magazine for holding a stack of blanks having adjustable sides to position different sizes of blanks, means to relatively move the tool and pattern to transfer the point of operation of the tool around the margin of the blank, means to transfer blanks from the magazine to the pattern, and means for positioning different sizes of blanks on the pattern.

43. A sole preparing machine having, in combination, a sole pattern, means for clamping a sole upon the pattern, a tool carrier, a grooving knife mounted on the carrier for operating on the margin of the blank, means to relatively move the support and carrier to transfer the point of operation of said knife around the blank, and means for automatically moving the grooving knife into and out of operation on the blank when operating upon the heel and the toe portions of the margin.

44. A sole preparing machine having, in combination, means for supporting and operating upon the marginal portion of a sole blank, means for automatically removing the blank from the support comprising an arm movable toward and away from the support having a sole gripping device for seizing and withdrawing the blank from the support, and means for releasing the blank from the gripping device after it is withdrawn from the support.

In testimony whereof we have signed our names to this specification.

HENRY W. WINTER.
EDWIN W. SMITH.